United States Patent
Fujiwara

(10) Patent No.: US 6,768,289 B2
(45) Date of Patent: Jul. 27, 2004

(54) CHARGE/DISCHARGE PROTECTION CIRCUIT WITH LATCH CIRCUIT FOR PROTECTING A CHARGE CONTROL FET FROM OVERHEATING IN A PORTABLE DEVICE

(75) Inventor: Akihiko Fujiwara, Tokyo (JP)

(73) Assignee: Ricoh Company, Ltd. (JP)

( * ) Notice: Subject to any disclaimer, the term of this patent is extended or adjusted under 35 U.S.C. 154(b) by 0 days.

(21) Appl. No.: 10/392,886

(22) Filed: Mar. 21, 2003

(65) Prior Publication Data

US 2003/0141848 A1 Jul. 31, 2003

Related U.S. Application Data

(63) Continuation of application No. 10/017,189, filed on Dec. 18, 2001, now Pat. No. 6,563,292.

(30) Foreign Application Priority Data

Dec. 26, 2000 (JP) ........................................ 2000-394035

(51) Int. Cl.[7] ............................................. H01M 10/46
(52) U.S. Cl. ...................................... 320/134; 320/136
(58) Field of Search ................................ 320/134, 135, 320/136, 149, 150, 162

(56) References Cited

U.S. PATENT DOCUMENTS 5,841,265 A    11/1998  Sudo et al.

6,563,292 B2 *  5/2003  Fujiwara

FOREIGN PATENT DOCUMENTS

| JP | 4-075430  | 3/1992 |
| JP | 9-182283  | 7/1997 |
| JP | 10-285810 | 10/1998 |
| JP | 11-103528 | 4/1999 |

* cited by examiner

Primary Examiner—Edward H. Tso
(74) Attorney, Agent, or Firm—Dickstein Shapiro Morin & Oshinsky LLP

(57) ABSTRACT

A charge/discharge protection circuit prevents a charge control FET from being overheated or ignited so as to improve safety by preventing an oscillating operation of the charge control FET, which is connected to a charge path of a secondary battery in series so as to cut off a charge current. A discharge control FET is connected to the charge path in series so as to cut off a discharge current from the secondary battery. A latch circuit latches an overcharge detection signal output from an overcharge detection circuit and outputs a signal so as to control the charge control FET. A delay circuit delays the discharge over-current detection signal and supplies the delayed discharge over-current detection signal to the discharge control FET. A reset circuit resets the latch circuit so as to turn on the charge control FET when a discharge over-current is detected and an overcharge is not detected.

18 Claims, 2 Drawing Sheets

CHARGE/DISCHARGE PROTECTION CIRCUIT WITH LATCH CIRCUIT FOR PROTECTING A CHARGE CONTROL FET FROM OVERHEATING IN A PORTABLE DEVICE

This application is a continuation of application Ser. No. 10/017,189, filed on Dec. 18, 2001, now U.S. Pat. No. 6,563,292.

BACKGROUND OF THE INVENTION

1. Field of the Invention

The present invention generally relates to a charge/discharge protection circuit for a secondary battery and, more particularly, to a charge/discharge protection circuit protecting a charge/discharge control field effect transistor (FET) from overheating due to repetition of on and off. The present invention also relates to a battery pack incorporating such a charge/discharge control field effect transistor, and an electronic device using such a battery pack.

2. Description of Related Art

Many portable electronic devices use a lithium-ion secondary battery. The lithium-ion secondary battery has a problem in that an accident may occur when being overcharged. Moreover, the lithium-ion secondary battery has a problem in that a number of charge/discharge cycles within a service life is reduced if the lithium-ion secondary battery is over-discharged.

In order to solve such a problem, a protection switch is provided to a charge/discharge path between a lithium secondary battery and a main part of a device. The protection switch is turned off so as to prevent the lithium-ion secondary battery being further overcharged or over-discharged when a state (overcharged state) where the lithium-ion secondary battery is charged to have a voltage more than a predetermined voltage or a state (over-discharged state) where the lithium-ion secondary battery is discharged to have a voltage below a predetermined voltage is detected.

The charge/discharge protection circuit, which protects a secondary battery by detecting an overcharged state, an over-discharged state or an over-current so as to cut off a charge/discharge path to the secondary battery, is disclosed in, for example, Japanese Laid Open Patent Applications No. 11-103528, No. 10-285810 and No. 9-182283 and Japanese Patent Publication No. 2872365.

In the above-mentioned conventional charge/discharge protection circuit, an overcharge detection circuit has a hysteresis. That is, if an overcharge of a secondary battery is detected, a charge control field effect transistor (FET) is turned off so as to establish a charge unable state, and, thereafter, the charge control FET is turned on so as to establish a charge enable state when a battery voltage returns to a charge return voltage which is lower than an overcharge detection voltage.

However, in a semiconductor device of the conventional protection circuit, if a deteriorated battery having a high internal-impedance caused by repeated charge and discharge is charged by a charger having a normal current value but a large voltage value, or if a battery having a normal internal-impedance is charged by a charger having a large voltage value and a large current value, the battery voltage drops when a charge current path is cut off (the charge control FET is turned off) due to an overcharge state being detected by an overcharge detection circuit. Under such circumstances, the battery-voltage drop may exceed the hysteresis of the over-discharge detection circuit, and the battery voltage may reach the level of the over-discharge return voltage.

In such a case, a charge operation is started again by turning the charge control FET on, and, thereafter, the same operation is repeated. That is, an oscillating operation occurs in that detection of overcharge→cut off of a charge current (turn off the charge control FET)→drop of the battery voltage→start of charge (turn on the charge control FET) →detection of overcharge are repeated. In such a case, there is a risk in that the charge control FET generates heat, which causes an ignition in the worst case.

SUMMARY OF THE INVENTION

It is a general object of the present invention to provide an improved charge/discharge protection circuit in which the above-mentioned problems are eliminated.

A more specific object of the present invention is to provide a charge/discharge protection circuit which prevents a switching FET from being overheated or ignited so as to improve safety by preventing an oscillating operation of the switching FET due to repeated detection of overcharge and a returning operation in a case where a battery having a high internal impedance is charged by a charger having a normal current value but a large voltage value and also a case where a battery having a normal internal impedance by a charger having both a large voltage value and a large current value.

Another object of the present invention is to provide a battery pack having the above-mentioned charge/discharge protection circuit and an electronic device, such as a cellular phone, which uses such a battery pack.

In order to achieve the above-mentioned objects, there is provided according to one aspect of the present invention a charge/discharge protection circuit comprising: an overcharge detection circuit which detects an overcharge of a secondary battery connected to the charge/discharge protection circuit and outputs an overcharge detection signal; a discharge over-current detection circuit which detects a discharge over-current of the secondary battery and outputs a discharge over-current detection signal; a charge control field effect transistor (FET) connected to a charge path of the secondary battery in series so as to cut off a charge current supplied to the secondary battery; a discharge control field effect transistor (FET) connected to the charge path of the secondary battery in series so as to cut off a discharge current supplied from the secondary battery; a latch circuit which latches the overcharge detection signal output from the overcharge detection circuit and outputs a signal so as to control the charge control FET; a first delay circuit which delays the discharge over-current detection signal output from the discharge over-current detection circuit and supplies the delayed discharge over-current detection signal to the discharge control FET; and a reset circuit which resets the latch circuit so as to turn on the charge control FET when the discharge over-current is detected by the discharge over-current detection circuit and when the overcharge is not detected by the overcharge detection circuit.

In the above-mentioned invention, the reset circuit may cause the latch circuit to continuously output the signal to turn on the charge control FET when the over-current detected by the discharge over-current detection circuit disappears during a delay time of the delay circuit. Additionally, the reset circuit may includes: a second delay circuit which delays the charge over-current detection signal for a predetermined time; and a logic circuit which logically operates the overcharge detection signal after being delayed by the second delay circuit and the discharge over-current detection signal output by the discharge over-current detection circuit. Further, the logic circuit may includes: an inverter inverting the overcharge detection signal after being delayed by the second delay circuit; and an AND circuit performing an AND operation on the inverted overcharge detection signal and the discharge over-current detection signal output by the discharge over-current detection circuit.

Additionally, the charge/discharge protection circuit according to the present invention may further comprise a logic circuit between the first delay circuit and the discharge control FET so as to maintain the discharge control FET being turned on when the latch circuit is reset during a delay time of the first delay circuit. The logic circuit may include: a first inverter inverting the discharge over-current detection signal output from the discharge over-current detection circuit; a second inverter inverting the discharge over-current detection signal inverting the discharge over-current detection signal after being delayed by the first delay circuit; and an OR circuit which performs a summing operation on outputs of the first and second inverters and supplies a result of the summing operation to discharge control FET.

Additionally, according to other aspects of the present invention, there are provided a battery pack using the charge/discharge protection circuit and an electronic device having such a battery pack.

Other objects, features and advantages of the present invention will become more apparent from the following detailed descriptions when read in conjunction with the accompanying drawings.

DETAILED DESCRIPTION OF THE PREFERRED EMBODIMENT

First, a description will be given of the charge/discharge protection circuit proposed in Japanese Patent Application No. 2000-296457 (prior application) by the present inventor. In the charge/discharge protection circuit in the prior application, a charge over-current is taken into consideration.

Figure 1:
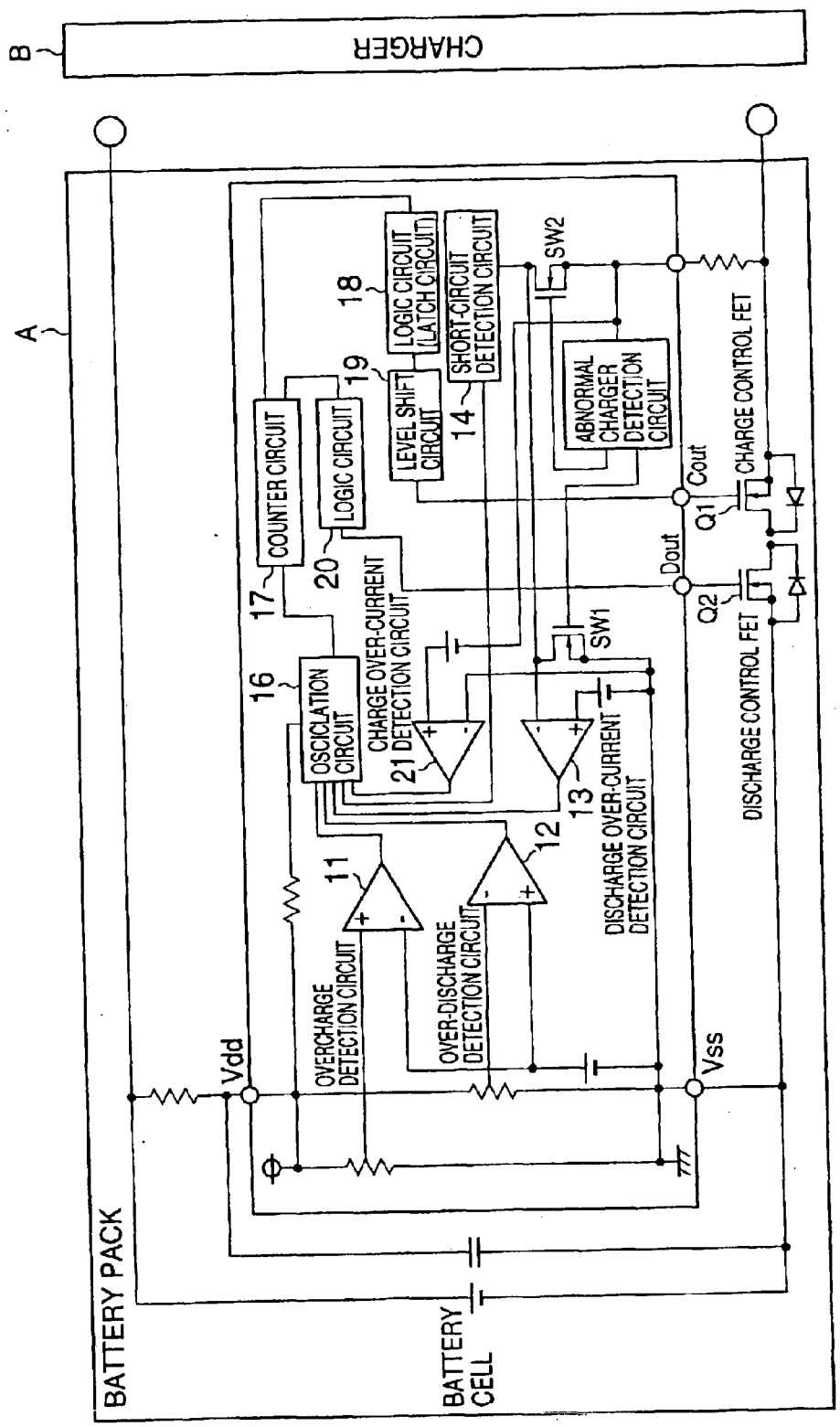
FIG. 1 is a block diagram of a battery protection circuit including a charge/discharge protection circuit.

FIG. 1 is a block diagram of a battery protection circuit including the charge/discharge protection circuit disclosed in the prior application. The battery protection circuit is incorporated into a battery pack A to which a charger B is connected to charge a battery cell provided in the battery pack A.

In the prior application, the charge/discharge protection circuit 1, which constitutes a principal part of a battery pack A, comprises an overcharge detection circuit 11, an over-discharge detection circuit 12, a discharge over-current detection circuit 13, a short-circuit detection circuit 14, an abnormal charger detection circuit 15, an oscillation circuit 16, a counter circuit 17, logic circuits 18 and 20, a level shift circuit 19 and a charge over-current detection circuit 21.

If an overcharge, over-discharge, discharge over-current, charge over-current or short-circuit is detected by the respective overcharge detection circuit 11, over-discharge detection circuit 12, discharge over-current detection circuit 13, charge over-current detection circuit 21 or short-circuit detection circuit 14, the oscillation circuit 16 starts an operation and the counter circuit 17 starts a counting operation. When a delay time, which is previously set up at the time of each detection, is counted by the counter circuit 17 and if an overcharge or a charge over-current is detected, an output Gout is set to a low level through the logic circuits (latch etc.) 18 and the level shift circuit 19, and a charge control field effect transistor (FET) Q1 is turned off. On the other hand, when an over-discharge or a discharge over-current or short circuit is detected, an output Dout is set to a low level. As a result, a discharge control field effect transistor (FET) Q2 is turned off.

When the charger B is connected to the battery pack A and a charge current flows in the battery pack A, a source voltage of the charge control FET Q1 becomes lower than a source voltage of the discharge control FET Q2. The source voltage of the discharge control FET Q2 is equal to a Vss terminal voltage of the semiconductor device. Although a resistor is connected to a V-terminal of the semiconductor device, the source voltage of the charge control FET Q1 becomes almost equal to the V-terminal voltage of the semiconductor device since the V-terminal has a high impedance. Therefore, when a charge current flows, the V-terminal voltage becomes lower than the Vss terminal voltage. When the V-terminal voltage becomes lower than the Vss terminal voltage by a predetermined voltage (charge over-current detection voltage), a charge over-current is detected, and, thereby, the output Cout is set to a low level and the charge control FET Q1 is turned off.

Figure 2:
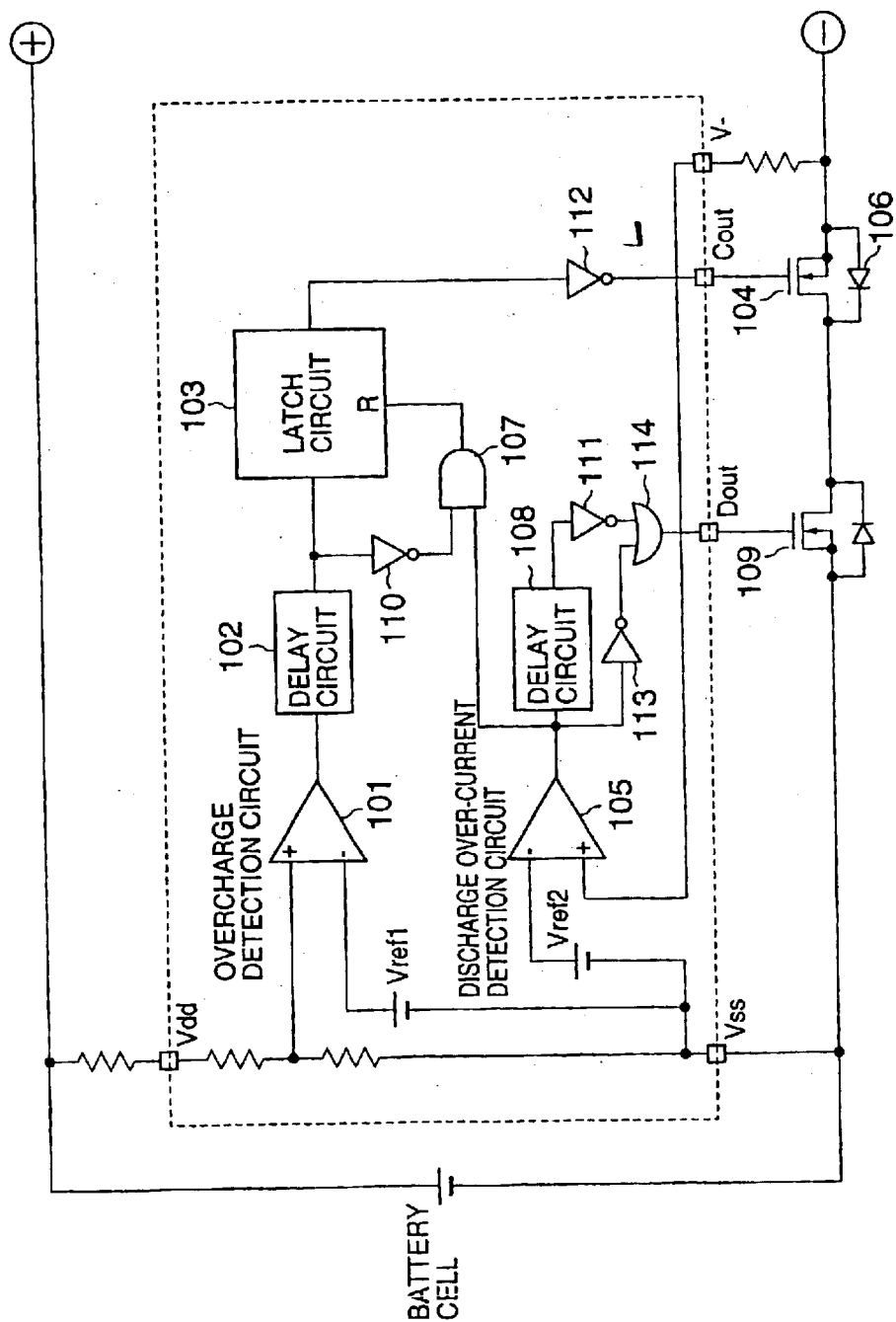
FIG. 2 is a block diagram of a part of a charge/discharge protection circuit according to the present invention.

A description will now be given, with reference to FIG. 2, of a charge/discharge protection circuit according to an embodiment of the present invention. FIG. 2 is a block diagram of a part of the charge/discharge protection circuit according to the present invention. The charge/discharge protection circuit is provided in the form of a semiconductor device.

The overcharge detection circuit 101, the delay circuit 102, the latch circuit 103, the charge control FET 104, the discharge over-current detection circuit 105, the delay circuit 108 and the discharge control FET 109 shown in FIG. 2 correspond to the over-discharge detection circuit 11, the oscillation circuit 16 and the counter circuit 17, the logic circuit 18, the charge control FET Q1, the discharge over-current detection circuit 13, the oscillation circuit 16, the counter circuit 17 and the discharge control FET Q2 shown in FIG. 1, respectively. In FIG. 2, other parts shown in FIG. 1 are omitted for the sake of simplification. In addition, unlike the over-discharge detection circuit 11 shown in FIG. 11, the over-discharge detection circuit 101 according to the present embodiment is constituted by a comparator having no hysteresis. An AND circuit 107 and an inverter 110 shown in FIG. 2 are newly added parts.

In the circuit structure shown in FIG. 2, if the overcharge detection circuit 101 detects an overcharge, the output of the overcharge detection circuit 101 is supplied to the latch circuit 103, after being delayed for a predetermined time by the delay circuit 102. The output of the latch circuit 103 is supplied through the inverter 112 to a gate of the charge control FET 104 as a low-level signal "L". Thereby, the charge control FET 104 is turned off, and a charge current is interrupted (an overcharged state).a A description will now be given of a structure which does not return from the overcharged state to a normal state when the charger is connected to the battery pack.

In order to return from an overcharged state, the latch circuit 103 must be reset. In order to reset the latch circuit 103, the output of the overcharge detection circuit 101 must be the low level "L" and a high-level signal "H" must be supplied to one of input terminals of the AND circuit 107 through the delay circuit 102 and the inverter 110. Moreover, at the same time, the output of the electric discharge over-current detection circuit 105 must be the high level "H", and the high-level signal "H" must be supplied to the other of the terminals of the AND circuit 107.

Here, the fact that the output of the overcharge detection circuit 101 is the low level "L" means that the battery voltage is below an overcharge detection voltage (Vref1). Moreover, the fact that the output of the electric discharge over-current detection circuit 105 is high level "H" means that a V-potential is higher than a discharge over-current detection voltage (Vref2). Therefore, the conditions to reset the latch circuit 103 are that the battery voltage is lower than the overcharge detection voltage (Vref1) and the V-potential is higher than the discharge over-current detection voltage (Vref2).

However, after the overcharge detection circuit 101 detects an overcharge and turns off the charge control FET 104 so as to interrupt a charge current (overcharged state), the V-potential does not exceed the discharge over-current detection voltage (Vref2) in a state where the charger is continuously connected. Accordingly, in the state where the charger is continuously connected, the charge control FET 104 will never be turned on no matter how the battery voltage drops. Therefore, the above-mentioned oscillation of the charge control FET 104 will never occur. Consequently, the problem of heat generation or an ignition of the charge control FET 104 is eliminated.

It should be noted that the inverter 110 and the AND circuit 107 together forms a logic circuit, which may be referred to as a reset circuit for resetting the latch circuit 103.

A description will now be given of a return operation from the overcharged state at the time a load is connected to the battery pack.

If the charger is disconnected and a load is connected in a state where the battery voltage is less than the overcharge detection voltage (Vref1), a load current flows though a parasitic diode 106, which exists within the charge control FET 104 although the charge control FET 104 is turned off. The load current generates a normal direction voltage Vf in the diode 106. Therefore, the V-potential is raised higher than Vss by the normal direction voltage Vf. The normal direction voltage Vf is about 0.5 V to 0.7 V. Since the discharge over-current detection voltage (Vref2) is generally set to about 0.1 V to 0.2 V, the output of the discharge over-current detection circuit 105 is inverted and becomes the high level "H".

At this time, both two inputs of the AND circuit 107 become high level "H", and the output of the AND circuit 107, i.e., the input to the reset terminal R of the latch circuit 103, becomes high level "H". Thereby, the latch circuit 103 changes from a latch state to a reset state, and outputs a low-level signal "L". The low-level signal "L" is supplied to the gate of the charge control FET 104 after being inverted to a high-level signal "H" by the inverter 112. Therefore, the charge control FET 104 is turned on, thereby returning from the overcharged state.

On the other hand, in a case in which only the inverter 111 is provided between the output terminal of the discharge over-current detection circuit 105 and the gate of the discharge control FET 109, if the output of the discharge over-current detection circuit 105 is changed to the high level "H" when the charger is disconnected and the load is connected, the high-level signal "H" acts to supply a low-level signal "L" to the gate of the discharge control FET 109 via the inverter 111. When the gate voltage of the discharge control FET 109 is changed to the low level "L", the discharge control FET 109 is turned off, and the load current is interrupted. Therefore, there is a problem in that it becomes impossible to pass a load current even if a load is connected after detecting an overcharge.

Then, in the present invention, as shown in the circuit structure of FIG. 2, a delay circuit 108, an inverter 111 and an inverter 113 are provided between the output terminal of the discharge over-current detection circuit 105 and the gate of the discharge control FET 109 so that the delay circuit 108 and the inverter 111 are series-connected, and the inverter 113 is connected parallel to the series-connected delay circuit 108 and the inverter 111. Signals from the inverter 111 and the inverter 113 are supplied to an OR (logical sum) circuit 114, and an output of the OR circuit 114 is supplied to the gate of the discharge control FET 109.

Even when the output of the discharge over-current detection circuit 105 changes to the high level "H", the discharge control FET 109 is not immediately turned off. That is, the discharge control FET 109 is turned off after the delay of a predetermined time (for example, 10 msec). However, if the charge control FET 104 is turned on by resetting the latch circuit 103 from a latch state during the predetermined delay time, the above-mentioned normal direction voltage Vf of the parasitic diode 106 disappears since the delay time by the AND circuit 107, the latch circuit 103 and the inverter 112, etc. is less than 1 msec.

If the normal direction voltage Vf of the parasitic diode 106 does not exist, the V-potential becomes lower than the discharge over-current detection voltage (Vref2), and the output of the discharge over-current detection circuit 105 is changed to the low level "L". Thereby, a high-level signal "H" is supplied to the gate of the discharge control FET 109 through the inverter 113. Consequently, the gate of the electric discharge does not change to the low level "L" while maintaining the high level "H".

Therefore, it becomes possible to pass a load current, and the above-mentioned problem is eliminated. It should be noted that since the output of the discharge over-current detection circuit 105 is supplied to the OR circuit 114 through the inverter 113, if the output of the electric discharge over-current detection circuit 105 becomes a low level "L", the discharge control FET 109 is not turned off so as to maintain the on state after the predetermined delay time (for example, 10 msec) according to the delay circuit 108 has elapsed. Thus, it becomes possible to continuously supply a load current when a load is connected after detecting an overcharge.

It should be noted that the circuit structure shown in FIG. 2, which includes the delay circuit 108, the inverter 111, the inverter 113 and the OR circuit 114, is merely an example of the present invention. Namely, any circuit structure may be used if the circuit structure turns off the discharge control FET 109 with a predetermined time delay when the discharge over-current detection circuit 105 detects an over-current, while maintaining the discharge control FET being turned on without being turned off when the discharge over-current detection circuit 105 does not detect an over-current during the delay time.

In the above-mentioned structure, the inverters 111 and 113 and the OR circuit 114 together form a logic circuit to maintain the discharge control FET 109 being turned on when the latch circuit 103 is reset during the delay time of the delay circuit 108.

It should be noted that the structure according to the present composition invention is suitable for charge/ discharge protection circuits, such as a lithium-ion secondary battery. Additionally, the charge/discharge protection circuit according to the present embodiment is also applicable to a battery pack incorporating a charge/discharge circuit or an electronic device using a battery pack, such as, for example, a cellular phone, a digital camera, a portable audio equipment, etc.

The present invention is not limited to the specifically disclosed embodiments, and variations and modifications may be made without departing from the scope of the present invention.

The present application is based on Japanese priority application No. 2000-394035 filed on Dec. 26, 2000, the entire contents of which are hereby incorporated by reference.

What is claimed is:

1. A cellular telephone comprising:

a battery pack with a secondary battery and a charge/discharge protection circuit, said charge/discharge protection circuit comprising:

an overcharge detection circuit which detects an overcharge of said secondary battery connected to said charge/discharge protection circuit and outputs an overcharge detection signal;

a discharge over-current detection circuit which detects a discharge over-current of said secondary battery and outputs a discharge over-current detection signal;

a charge control field effect transistor (FET) connected to a charge path of said secondary battery in series so as to cut off a charge current supplied to said secondary battery;

a discharge control field effect transistor (FET) connected to the charge path of said secondary battery in series so as to cut off a discharge current supplied from said secondary battery;

a latch circuit which latches the overcharge detection signal output from said overcharge detection circuit and outputs a signal so as to control said charge control FET;

a first delay circuit which delays the discharge over-current detection signal output from said discharge over-current detection circuit and supplies the delayed discharge over-current detection signal to said discharge control FET; and a reset circuit which resets said latch circuit so as to turn on said charge control FET when the discharge over-current is detected by said discharge over-current detection circuit and when the overcharge is not detected by said overcharge detection circuit.

2. The cellular telephone of claim 1, wherein said reset circuit causes said latch circuit to continuously output the signal to turn on said charge control FET when the over-current detected by said discharge over-current detection circuit disappears during a delay time of said delay circuit.

3. The cellular telephone of claim 2, wherein said reset circuit includes:

a second delay circuit which delays the charge over-current detection signal for a predetermined time; and a logic circuit which logically operates the overcharge detection signal after being delayed by said second delay circuit and the discharge over-current detection signal output by said discharge over-current detection circuit.

4. The cellular telephone of claim 3, wherein said logic circuit includes:

an inverter inverting the overcharge detection signal after being delayed by said second delay circuit; and an AND circuit performing an AND operation on the inverted overcharge detection signal and the discharge over-current detection signal output by said discharge over-current detection circuit.

5. The cellular telephone of claim 1, further comprising a logic circuit between said first delay circuit and said discharge control FET so as to maintain said discharge control FET being turned on when said latch circuit is reset during a delay time of said first delay circuit.

6. The cellular telephone of claim 5, wherein said logic circuit includes:

a first inverter inverting the discharge over-current detection signal output from said discharge over-current detection circuit;

a second inverter inverting the discharge over-current detection signal inverting the discharge over-current detection signal inverting the discharge over-current detection signal after being delayed by said first delay circuit; and an OR circuit which performs a summing operation on outputs of said first and second inverters and supplies a result of the summing operation to said discharge control FET.

7. A digital camera comprising:

a battery pack with a secondary battery and a charge/discharge protection circuit, said charge/discharge protection circuit comprising:

an overcharge detection circuit which detects an overcharge of said secondary battery connected to said charge/discharge protection circuit and outputs an overcharge detection signal;

a discharge over-current detection circuit which detects a discharge over-current of said secondary battery and outputs a discharge over-current detection signal;

a charge control field effect transistor (FET) connected to a charge path of said secondary battery in series so as to cut off a charge current supplied to said secondary battery;

a discharge control field effect transistor (FET) connected to the charge path of said secondary battery in series so as to cut off a discharge current supplied from said secondary battery;

a latch circuit which latches the overcharge detection signal output from said overcharge detection circuit and outputs a signal so as to control said charge control FET;

a first delay circuit which delays the discharge over-current detection signal output from said discharge over-current detection circuit and supplies the delayed discharge over-current detection signal to said discharge control FET; and a reset circuit which resets said latch circuit so as to turn on said charge control FET when the discharge over-current is detected by said discharge over-current detection circuit and when the overcharge is not detected by said overcharge detection circuit.

8. The digital camera of claim 7, wherein said reset circuit causes said latch circuit to continuously output the signal to turn on said charge control FET when the over-current detected by said discharge over-current detection circuit disappears during a delay time of said delay circuit.

9. The digital camera of claim 8, wherein said reset circuit includes:
   a second delay circuit which delays the charge over-current detection signal for a predetermined time; and
   a logic circuit which logically operates the overcharge detection signal after being delayed by said second delay circuit and the discharge over-current detection signal output by said discharge over-current detection circuit.

10. The digital camera of claim 9, wherein said logic circuit includes:
    an inverter inverting the overcharge detection signal after being delayed by said second delay circuit; and
    an AND circuit performing an AND operation on the inverted overcharge detection signal and the discharge over-current detection signal output by said discharge over-current detection circuit.

11. The digital camera of claim 7, further comprising a logic circuit between said first delay circuit and said discharge control FET so as to maintain said discharge control FET being turned on when said latch circuit is reset during a delay time of said first delay circuit.

12. The digital camera of claim 11, wherein said logic circuit includes:
    a first inverter inverting the discharge over-current detection signal output from said discharge over-current detection circuit;
    a second inverter inverting the discharge over-current detection signal inverting the discharge over-current detection signal inverting the discharge over-current detection signal after being delayed by said first delay circuit; and
    an OR circuit which performs a summing operation on outputs of said first and second inverters and supplies a result of the summing operation to said discharge control FET.

13. Portable audio equipment comprising:
    a battery pack with a secondary battery and a charge/discharge protection circuit, said charge/discharge protection circuit comprising:
    an overcharge detection circuit which detects an overcharge of said secondary battery connected to said charge/discharge protection circuit and outputs an overcharge detection signal;
    a discharge over-current detection circuit which detects a discharge over-current of said secondary battery and outputs a discharge over-current detection signal;
    a charge control field effect transistor (FET) connected to a charge path of said secondary battery in series so as to cut off a charge current supplied to said secondary battery;
    a discharge control field effect transistor (FET) connected to the charge path of said secondary battery in series so as to cut off a discharge current supplied from said secondary battery;
    a latch circuit which latches the overcharge detection signal output from said overcharge detection circuit and outputs a signal so as to control said charge control FET;
    a first delay circuit which delays the discharge over-current detection signal output from said discharge over-current detection circuit and supplies the delayed discharge over-current detection signal to said discharge control FET; and
    a reset circuit which resets said latch circuit so as to turn on said charge control FET when the discharge over-current is detected by said discharge over-current detection circuit and when the overcharge is not detected by said overcharge detection circuit.

14. The portable audio equipment of claim 13, wherein said reset circuit causes said latch circuit to continuously output the signal to turn on said charge control FET when the over-current detected by said discharge over-current detection circuit disappears during a delay time of said delay circuit.

15. The portable audio equipment of claim 14, wherein said reset circuit includes:
    a second delay circuit which delays the charge over-current detection signal for a predetermined time; and
    a logic circuit which logically operates the overcharge detection signal after being delayed by said second delay circuit and the discharge over-current detection signal output by said discharge over-current detection circuit.

16. The portable audio equipment of claims 15, wherein said logic circuit includes:
    an inverter inverting the overcharge detection signal after being delayed by said second delay circuit; and
    an AND circuit performing an AND operation on the inverted overcharge detection signal and the discharge over-current detection signal output by said discharge over-current detection circuit.

17. The portable audio equipment of claim 13, further comprising a logic circuit between said first delay circuit and said discharge control FET so as to maintain said discharge control FET being turned on when said latch circuit is reset during a delay time of said first delay circuit.

18. The portable audio equipment of claim 17, wherein said logic circuit includes:
    a first inverter inverting the discharge over-current detection signal output from said discharge over-current detection circuit;
    a second inverter inverting the discharge over-current detection signal inverting the discharge over-current detection signal inverting the discharge over-current detection signal after being delayed by said first delay circuit; and
    an OR circuit which performs a summing operation on outputs of said first and second inverters and supplies a result of the summing operation to said discharge control FET.

* * * * *

UNITED STATES PATENT AND TRADEMARK OFFICE
CERTIFICATE OF CORRECTION

PATENT NO. : 6,768,289 B2
DATED : July 27, 2004
INVENTOR(S) : Akihiko Fujiwara

It is certified that error appears in the above-identified patent and that said Letters Patent is hereby corrected as shown below:

Title page,
Item [45], Date of Patent, "Jul. 27, 2004" should read -- **\*Jul. 27, 2004** --
Item [\*] Notice, -- This patent is subject to a terminal disclaimer -- should be inserted after "0 days."

Signed and Sealed this

First Day of February, 2005

JON W. DUDAS
*Director of the United States Patent and Trademark Office*